United States Patent
Kneafsey et al.

(10) Patent No.: US 6,844,080 B2
(45) Date of Patent: Jan. 18, 2005

(54) METAL ALKYL BORPHYDRIDE POLYMERISATION INITIATORS, POLYMERISABLE COMPOSITIONS, AND USES THEREOF

(75) Inventors: Brendan J. Kneafsey, Dublin (IE); Gerry Coughlan, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 92 days.

(21) Appl. No.: 10/399,229

(22) PCT Filed: Oct. 23, 2001

(86) PCT No.: PCT/IE01/00134

§ 371 (c)(1),
(2), (4) Date: Apr. 14, 2003

(87) PCT Pub. No.: WO02/34852

PCT Pub. Date: May 2, 2002

(65) Prior Publication Data

US 2004/0097673 A1 May 20, 2004

(30) Foreign Application Priority Data

Oct. 23, 2000 (EP) .......................... 00650166

(51) Int. Cl.$^7$ .............................................. B32B 27/30
(52) U.S. Cl. .................... 428/522; 428/520; 156/331.1; 526/178; 526/196; 526/201; 526/217
(58) Field of Search ................................ 428/520, 522; 156/331.1; 524/853; 526/213, 319, 217.1, 201, 178, 196

(56) References Cited

U.S. PATENT DOCUMENTS

| | | | |
|---|---|---|---|
| 3,236,823 A | 2/1966 | Jennes et al. .............. | 260/80.5 |
| 3,275,611 A | 9/1966 | Mottus et al. ............. | 260/80.5 |
| 3,661,744 A | 5/1972 | Kehr et al. ............ | 204/159.14 |
| 3,898,349 A | 8/1975 | Kehr et al. .................... | 427/36 |
| 4,008,340 A | 2/1977 | Kung et al. ................. | 426/651 |
| 4,018,851 A | 4/1977 | Baccei ....................... | 260/859 |
| 4,092,376 A | 5/1978 | Douek et al. .............. | 260/884 |
| 4,215,209 A | 7/1980 | Ray-Chaudhuri et al. ... | 526/292 |
| 4,295,909 A | 10/1981 | Baccei ..................... | 156/307.3 |
| 4,515,724 A | 5/1985 | Ritter ......................... | 260/410 |
| 4,536,546 A | 8/1985 | Briggs .......................... | 525/83 |
| 4,638,092 A | 1/1987 | Ritter ............................. | 568/1 |
| 4,639,498 A | 1/1987 | Ritter .......................... | 526/196 |
| 4,772,530 A | 9/1988 | Gottschalk et al. ......... | 430/138 |
| 4,772,541 A | 9/1988 | Gottschalk et al. ......... | 430/339 |
| 4,808,638 A | 2/1989 | Steinkraus et al. ........... | 522/24 |

(List continued on next page.)

FOREIGN PATENT DOCUMENTS

| | | | | |
|---|---|---|---|---|
| EP | 0 078 995 | 10/1982 | ............. | C09J/3/14 |
| EP | A-0 356 875 | 8/1989 | ............. | C08F/4/00 |
| JP | 73 01 8928 | 12/1969 | | |
| JP | 2000 327 683 | 11/2000 | ............. | C07F/5/02 |
| WO | WO 97/17383 | 5/1997 | ........... | C08F/20/12 |
| WO | WO 98/17694 | 4/1998 | ............. | C08F/4/52 |
| WO | WO 99/64528 | 12/1999 | ............. | C09J/4/00 |
| WO | WO 00/56779 | 9/2000 | ............. | C08F/4/52 |
| WO | WO 01/32716 | 5/2001 | ............. | C08F/4/00 |
| WO | WO 01/32717 A2 | 5/2001 | ............. | C08F/4/00 |
| WO | WO 0144311 | 6/2001 | ............. | C08F/4/52 |
| WO | WO 03/040151 A1 | 5/2003 | ............. | C07F/5/02 |

OTHER PUBLICATIONS

Pelter, A. and Smith, K., "Organic Boron Compounds", 689–708, 728–732, and 773–784, London (1972).
Roscher, Christof, et al., "Novel Radiation Curable Nanocomposites with Outstanding Material Properties", 322–329 (2002).
Barton, D. and Ollis, W.D., "Comprehensive Organic Chemistry", vol. 3, Ch. 14, Ed. Jones, D.N., Pergamon Press (1979).
Barton, D. and Ollis, W.D., "Comprehensive Organic Chemistry", vol. 3, Ch. 14, Ed. Jones, D.N., Pergamon Press (1979).

Primary Examiner—D. Lawrence Tarazano
(74) Attorney, Agent, or Firm—Stêven C. Bauman

(57) ABSTRACT

Metal alkyl borohydrides are used as initiators of polymerisation, particularly in adhesive compositions for bonding a wide range of substrates including low surface energy substrates such as polyolefins. As described, the metal alkyl borohydrides are of the formula I or II.

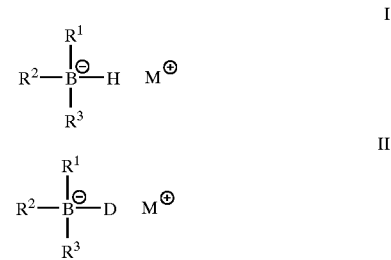

wherein
$R^1$ is $C_1$–$C_{10}$ alkyl,
$R^2$ and $R^3$, which may be the same or different, are H, D, $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^3$ may optionally be part of a carbocyclic ring, and
$M^+$ is a metal ion.

In particular, alkali metal trialkyl borohydrides are used, the alkali metal salt being selected from: Lithium triethylborohydride, Sodium triethylborohydride, Potassium triethylborohydride, Lithium tri-sec-butylborohydride, Sodium tri-sec-butylborohydride, Potassium tri-sec-butylborohydride, and Lithium triethylborodeuteride. Other exemplified compounds which are less effective on low surface energy substrates include Lithium 9-borabicyclo [3.3.1]-nonane (9BBN) hydride, Lithium thexylborohydride, Lithium trisiamylborohydride and Potassium trisiamylborohydride.

36 Claims, No Drawings

U.S. PATENT DOCUMENTS

| | | | | |
|---|---|---|---|---|
| 4,921,921 A | * | 5/1990 | Ritter | 526/195 |
| 4,942,201 A | | 7/1990 | Briggs et al. | 525/71 |
| 4,950,581 A | | 8/1990 | Koike et al. | 430/281 |
| 4,963,220 A | | 10/1990 | Bachmann et al. | 156/307.3 |
| 5,106,928 A | | 4/1992 | Skoultchi et al. | 526/196 |
| 5,143,884 A | | 9/1992 | Skoultchi et al. | 502/160 |
| 5,151,520 A | | 9/1992 | Gottschalk et al. | 548/110 |
| 5,268,436 A | | 12/1993 | Huver et al. | 526/216 |
| 5,286,821 A | | 2/1994 | Skoultchi | 526/196 |
| 5,310,835 A | | 5/1994 | Skoultchi et al. | 526/198 |
| 5,376,746 A | | 12/1994 | Skoultchi | 526/196 |
| 5,539,070 A | * | 7/1996 | Zharov et al. | 526/198 |
| 5,616,796 A | | 4/1997 | Pocius et al. | 564/9 |
| 5,621,143 A | | 4/1997 | Pocius | 564/8 |
| 5,681,910 A | | 10/1997 | Pocius | 526/198 |
| 5,684,102 A | | 11/1997 | Pocius et al. | 526/198 |
| 5,686,544 A | | 11/1997 | Pocius | 526/196 |
| 5,718,977 A | | 2/1998 | Pocius | 428/422 |
| 5,795,657 A | | 8/1998 | Pocius et al. | 428/516 |
| 5,866,631 A | * | 2/1999 | Nakagawa et al. | 523/118 |
| 5,872,197 A | | 2/1999 | Deviny | 526/196 |
| 5,883,208 A | | 3/1999 | Deviny | 526/198 |
| 5,935,711 A | | 8/1999 | Pocius et al. | 428/421 |
| 6,110,987 A | | 8/2000 | Kamata et al. | 522/64 |
| 6,171,700 B1 | | 1/2001 | Sugita et al. | 428/408 |
| 6,252,023 B1 | | 6/2001 | Moren | 526/196 |
| 6,660,784 B2 | * | 12/2003 | Ibaragi et al. | 523/115 |
| 2002/0025381 A1 | | 2/2002 | Sonnenschein et al. | 427/372.2 |
| 2002/0028894 A1 | | 3/2002 | Sonnenschein et al. | 526/198 |
| 2002/0031607 A1 | | 3/2002 | Sonnenscheim et al. | 427/372.2 |
| 2002/0033227 A1 | | 3/2002 | Sonnenschein et al. | 156/306.9 |
| 2002/0195453 A1 | | 12/2002 | McLeod | 220/562 |
| 2003/0044553 A1 | | 3/2003 | Ramanathan et al. | 428/35.8 |
| 2003/0047268 A1 | | 3/2003 | Korchnak et al. | 156/94 |
| 2003/0195318 A1 | * | 10/2003 | Moren | 526/319 |
| 2003/0199651 A1 | * | 10/2003 | Kendall et al. | 526/195 |
| 2003/0226472 A1 | * | 12/2003 | Kneafsey et al. | 106/18.13 |
| 2004/0010099 A1 | * | 1/2004 | Kneafsey et al. | 526/90 |
| 2004/0048070 A1 | * | 3/2004 | Kendall et al. | 428/411.1 |
| 2004/0077783 A1 | * | 4/2004 | Maandi et al. | 524/853 |
| 2004/0097673 A1 | * | 5/2004 | Kneafsey et al. | 526/196 |

* cited by examiner

METAL ALKYL BORPHYDRIDE POLYMERISATION INITIATORS, POLYMERISABLE COMPOSITIONS, AND USES THEREOF

CROSS REFERENCE TO RELATED APPLICATION

This application is related to the application entitled "Polymerisation Initiators, Polymerisable Compositions, and Uses Thereof for Bonding Low Surface Energy Substrates" filed on even date herewith as International application No. (Agent's file PM978PCT) claiming priority from European Patent Application No. 00650166.2 filed on 23 Oct. 2000; the contents of the said International application are incorporated herein by reference.

1. Field of the Invention

This invention relates to novel polymerisation initiators, polymerisable compositions and uses thereof, particularly uses as adhesives, sealants, surface coatings, moulding resins, and composite matrices. In one aspect, this invention is concerned with acrylic adhesive compositions, particularly compositions for bonding a wide range of substrates including low surface energy substrates such as polyolefins to each other or to other substrates such as metals.

2. Brief Description of Related Technology

The chemistry of organic boron compounds has been studied in detail (see "Comprehensive Organic Chemistry" by Barton D. and Ollis W. D., Volume 3, Edited by Jones D. N., Pergamon Press, 1979,Part 14). The use of organoboranes such as the trialkylboranes including triethylborane and tributylborane for initiating and catalyzing the polymerisation of vinyl monomers is well known. However such organoborane compounds are known to be flammable in air so that the compounds and compositions containing them require special handling and the compositions have poor shelf stability (see for U.S. Pat. No. 3,236,823 Jennes et al., and the Background section of U.S. Pat. No. 5,935,711 Pocius et al., at column 2).

Certain boron alkyl compounds and their use as initiators of polymerisation are described in a series of patents of Wolfgang Ritter assigned to Henkel KgaA, including U.S. Pat. Nos. 4,515,724, 4,638,092, 4,638,498, 4,676,858 and 4,921,921 (hereinafter referred to as "the Ritter patents"). However the adhesive systems developed from these patents require the manufacture of trialkyl boranes from long chain fatty acids.

A series of patents of Skoultchi or Skoultchi et al. disclose a two-part initiator system for acrylic adhesive compositions in which the first part includes a stable organoborane amine complex and the second part includes a destabilizer or activator such as an organic acid or an aldehyde (U.S. Pat. Nos. 5,106,928; 5,143,884; 5,286,821; 5,310,835 and 5,376,746).

Japanese patent publication No. S48-18928 describes a method for adhering polyolefin or vinyl polymers using an adhesive obtained by adding trialkylboron to a vinyl monomer or vinyl monomer and vinyl polymer. Examples of trialkylboron include triisopropylboron, tri-n-butylboron, tripropylboron and tri-tert.-butylboron.

U.S. Pat. No. , 3,275,611, Mottus et al. describes a process for polymerising unsaturated monomers with a catalyst comprising an organoboron compound, a peroxygen compound and an amine complexing agent for the boron compound. Use of the polymerisation products as adhesives is not discussed.

It is well known that the bonding of polyolefin substrates and other low surface energy substrates causes particular difficulties. Attempts have been made to overcome this problem by extensive and expensive substrate surface preparation, for example by oxidation, plasma treatment, corona treatment or flame treatment, or by priming the surface with a high surface energy primer. However it is desired to develop adhesive compositions which will bond low surface energy substrates without such surface preparation.

U.S. Pat. No. 5,539,070 of Zharov et al., assigned to Minnesota Mining and Manufacturing Company and a series of patents of Alphonsus V. Pocius or Pocius et al. also assigned to Minnesota Mining and Manufacturing Company, including in particular U.S. Pat. Nos. 5,616,796, 5,621,143, 5,681,910, 5,684,102, 5,686,544, 5,718,977, 5,795,657 and 5,935,711 describe organoborane amine complexes which can be used in systems that initiate the polymerisation of acrylic monomers in compositions useful for bonding low surface energy plastics substrates such as polyethylene, polypropylene and polytetrafluoroethylene. PCT Publication No., WO 99/64528 also of Minnesota Mining and Manufacturing Company describes low odour polymerisable compositions comprising monomer blends and organoborane amine complex initiators. However these systems require the preparation of trialkyl borane amine complexes to achieve the desired performance and shelf stability. The manufacture of such complexes is an undesirably complicated process. Furthermore the presence of the amines results in cured adhesives that have a tendency to become yellow in colour on ageing.

PCT Publication No. WO 01/44311 of the Dow Chemical Company, published after the priority date of this application, also describes amine organoborane complex polymerisation initiators in bonding compositions for low surface energy substrates.

PCT Publication No. WO 01/32716 of 3M Innovative Properties Company, published after the priority date of this application, acknowledges that while complexes of an organoborane and an amine may be useful in many applications, certain problems may arise due to the use of amine complexing agents in such conventional complexes: for example, when the complexes contain a primary amine, adhesives prepared therefrom may be prone to discolouration, such as yellowing; furthermore, when including reactive diluents, such as aziridine—functional materials described in PCT Publication No. WO 98/17,694, for example, in compositions containing the complexes, the diluents may prematurely react with protic amines (i.e. those amines in which a nitrogen atom is bonded to at least one hydrogen atom) in such complexes, prematurely decomplexing the organoborane initiator. WO 01/32716 therefore proposes a complex of an organoborane and a complexing agent comprising at least one hydroxide or alkoxide, particularly a complex represented by the formula.

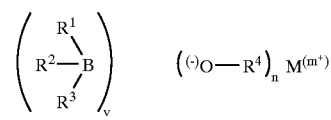

wherein $R^1$ is an alkyl group having 1 to about 10 carbon atoms; $R^2$ and $R^3$ may be the same or different and are selected from (i.e., they are independently selected from) alkyl groups having 1 to about 10 carbon atoms and phenyl-containing groups; the value of "v" is selected so as to provide an effective ratio of oxygen atoms of the alkoxides and/or hydroxides to boron atoms in the complex; each $R^4$ is independently selected from hydrogen or an organic group (e.g., an alkyl or alkylene group); $M^{(m+)}$ represents a countercation (comprising a monovalent cation, such as a Group IA metal (e.g., lithium, sodium and potassium) cation or onium, or a multivalent cation, such as a Group IIA metal (e.g., calcium and magnesium)cation); n is an integer greater than zero; and m is an integer greater than zero. Particular complexing agents comprise those having a countercation comprising a cation selected from sodium, potassium and tetraalkylammoniums.

When any $R^4$ is hydrogen, the complexing agent is said to comprise at least one hydroxide. When any $R^4$ is an organic group, the complexing agent is said to comprise at least one alkoxide.

According to WO 01/32716, the complexing agent (i.e., the hydroxide or alkoxide) is used in the form of a salt. That is, the complexing agent is stabilized by a suitable countercation such that the complexing agent is capable of complexing the initiator. Thus, in the Formula, $M^{(m+)}$ represents a countercation that stabilizes the complexing agent, not a cation that forms an ionic compound with the organoborane initiator.

It is stated in WO 01/32716 that hydroxides and alkoxides provide strong coupling to organometallic initiators, such as organoboranes, with the resulting complexes having excellent oxidative stability. Thus, the use of complexing agents comprising at least one hydroxide, alkoxide, or mixtures thereof is said to be particularly beneficial.

It is also stated in WO 01/32716 that such a complex is a tightly co-ordinated salt formed by association of a Lewis acid (the initiator) and a Lewis base (the hydroxide or alkoxide). This indicates that the oxygen atom of the alkoxide or hydroxide is bonded or coordinated to the boron atom of the initiator.

It is known to use tetraorganylborate salts of tetraalkylammonium, sodium or lithium as photopolymerisation initiators in photocurable compositions for imaging materials (see, for example U.S. Pat. No. 4,950,581 Koike et al, assigned to Fuji Photo Film Co. Ltd.; U.S. Pat. No. 6,110,987 Kamata et al. assigned to Showa Denko K.K.; U.S. Pat. No. 6,171,700 Sugita et al. assigned to Showa Denko K.K. and Showa Highpolymer Ltd.). Such tetraorganylborate salts do not have a boron-hydrogen bond. The distinction between boron-hydrogen compounds, triorganylboranes and organoborate salts is well illustrated in "Comprehensive Organic Chemistry" by Barton & Ollis (Ed. D Neville Jones) cited above, Volume 3, in which Chapters 14.2, 14.3 and 14.4 are devoted to them. The photopolymerisable compositions of the above-mentioned patents are not intended for use as adhesives, sealants and the like. Photopolymerisation systems operate by absorption of light energy, and the characteristic feature of such systems is that they have light-absorbing ability. It is not predictable whether photopolymerisation initiators will be suitable for other cure systems or for bonding substrates having particular surface energy conditions. In particular, the above-mentioned patents concerning photopolymerisation initiators do not provide any disclosure or teaching relating to the bonding of low surface energy substrates.

Despite the work of many researchers in this field, there is a need for polymerisation initiators which reduce the problems described above and which provide alternatives to the systems available hitherto. It is desirable to provide initiators which are commercially available compounds, thereby removing complicated manufacturing processes for such complexes from formulators' concerns, and/or to provide initiators which are relatively easy to handle compared to compounds of the prior art There is a need also for commercially acceptable compositions for bonding low surface energy substrates such as polyolefins, and for end users to have a variety of such compositions which achieve that result through different technical strategies.

SUMMARY OF THE INVENTION

This invention relates to the use of metal alkyl borohydrides as initiators of polymerisation. The applicants are not aware of any disclosure or teaching of the use of ionic compounds of this kind as polymerisation initiators. The term "hydride" as used herein includes all of the isotopes thereof including deuterides. A metal alkylborohydride has at least one alkyl group attached to the boron atom. In "Comprehensive Organic Chemistry" by Barton & Ollis, cited above, alkyl borohydrides are treated under the heading of "Organylhydroborates" (see para. 14.2.6.4).

In accordance with one aspect of the invention, the metal alkyl borohydrides used as initiators of polymerisation are selected from the group consisting of compounds of formula I or II:

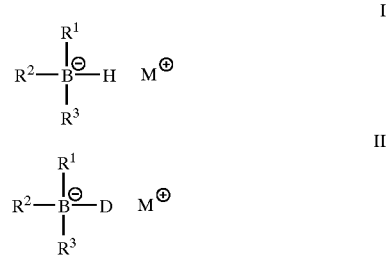

wherein
$R^1$ is $C_1$–$C_{10}$ alkyl,
$R^2$ and $R^3$, which may be the same or different, are H, D, $C_1$–$C_{10}$ alkyl or $C_3$–$C_{10}$ cycloalkyl, phenyl, or phenyl-substituted $C_1$–$C_{10}$ alkyl or $C_3$–$C_{10}$ cycloalkyl, provided that any two of $R^1$–$R^3$ may optionally be part of a carbocyclic ring, and
$M^+$ is a metal ion.

An alkyl group may suitably have 1–6 carbon atoms, for example 2–4 carbon atoms. An alkyl group may be straight-chain or branched, although straight chain is prefeered for bonding low surface energy polymers. A carbocyclic ring may be bridged by the boron atom.

Suitably at least two, and desirably three, of $R^1$–$R^3$ are $C_1$–$C_{10}$ alkyl.

Preferably the metal alkyl borohydride is of the formula I.

Due to the presence of the boron-hydrogen bond, the metal alkyl borohydrides are reducing agents, which provides a significant potential advantage over known organborane initiators. If and when alkylboranes are freed from the borohydride, they would be prone to oxidation and could produce peroxides. In that case, the presence of reducing agents (unreacted borohydride) would be beneficial in facilitating decomposition of these peroxides to produce radicals for polymerisation.

The presence of air or oxygen is desirable at the time of initiation of polymerisation e.g. when the two parts of a two-part composition are mixed.

The metal alkyl borohydrides used in the present invention are commercially available or are readily prepared by available methods. They are available or can be prepared in solutions which are easy to handle as compared to known trialkyl boranes, i.e. the solutions are not pyrophoric and only require the exclusion of moisture. The metal alkyl borohydride initiators do not use amines which have been used in the past to form covalent complexes with organoboranes. Once the organoborane of such complexes has reacted in the polymerisable composition, the amine can cause yellowing of a cured composition after ageing. A reduction or elimination of yellowing is a particular advantage for adhesives which are to be used in locations where appearance is important, e.g. in automobile manufacture. Amines may also give rise to odour problems. Compositions containing the metal alkyl borohydrides have good shelf stability.

If lithium hydride is reacted with trimethylborane in solvents such as tetrahydrofuran, monoglyme, diglyme, etc., either lithium trimethylborohydride (1:1 adduct, LiMe$_3$BH) or lithium hexamethyldiborohydride (1:2 adduct, LiMe$_3$BHBMe$_3$) may be formed (see Herbert C Brown et al. in "Addition Compounds of Alkali Metal Hydrides. 14. The Reaction of Trialkylboranes with Lithium Trialkylborohydrides", J.A.C.S/99:19/Sep. 14, 1977). The formula I or II as used herein encompasses 1:2 adducts of this kind, which may be represented by the formula Ia or IIa:

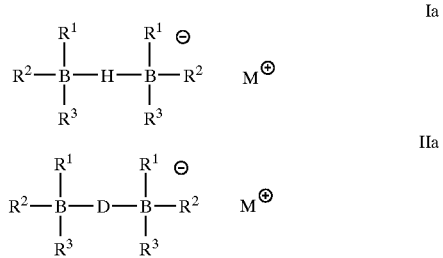

wherein $R^1$, $R^2$, $R^3$, and $M^+$ are as defined above. Part or all of the metal alkyl borohydride used in the present invention may be a 1:2 adduct of this kind.

The invention particularly relates to the use of metal alkyl borohydrides as polymerisation initiators in adhesive compositions or coating compositions.

The invention provides a polymerisable composition, which includes:

a) at least one free-radically polymerisable monomer component, and b) an effective amount of an initiator system for initiating polymerisation of the free-radically polymerisable monomer, said initiator system comprising a metal alkyl borohydride, particularly a compound of the formula I or II as defined above.

The polymerisable composition may suitably be a two-part composition in which the at least one free-radically polymerisable monomer component is provided in one part and the metal alkyl borohydride is provided in the other part. Alternatively the composition could be a one-part composition with suitable stabilisation and activation systems such as a moisture-latent acid or oxygen-latent acid. In a further alternative, the metal alkyl borohydride could be provided as a primer, in which the metal alkyl borohydride is applied to a substrate separately from the adhesive composition.

The polymerisable monomer or monomers may suitably be one or more (meth)acrylic monomers.

In one aspect the invention provides a two-part polymerisable adhesive composition, which includes:

part A) an effective amount of a polymerisation initiator comprising a metal alkyl borohydride, and a carrier which is inert to the metal alkyl borohydride;

part B) at least one (meth)acrylate monomer, optionally with a toughener, acidic monomer, filler and/or thickener.

Part B may suitably be a (meth)acrylic component. The terms (meth)acrylic and (meth)acrylate are used synonymously herein with regard to the monomer and monomer-containing component. The terms (meth)acrylic and (meth)acrylate include acrylic, methacrylic, acrylate and methacrylate.

Although the invention is not limited by any theory, it is believed that on mixing the initiator component with a polymerisable monomer component containing acid (or on release of acid in a system using a latent acid), the metal alkyl borohydride reacts with the acid to release triorganylboranes and metal salts of the acid, and possibly hydrogen.

Therefore in one aspect the invention provides a polymerisable composition, which includes a) at least one free-radically polymerisable monomer component, b) an effective amount of an initiator system for initiating polymerisation of the free-radically polymerisable monomer, said initiator system, comprising a metal alkyl borohydride, and c) an effective amount of a compound that is reactive with the metal alkyl borohydride for liberating the organoborane to initiate polymerisation of the at least one-free radically polymerisable monomer.

Suitably the compound that is reactive with the metal alkyl borohydride is present in part B of a two-part polymerisable acrylic adhesive composition as described above.

Moisture is excluded from contact with the metal alkyl borohydride until polymerisation has been initiated. Suitably part A of the two-part adhesive composition is packaged in a moisture-free and moisture-impermeable applicator or other container.

The adhesive compositions disclosed herein are useful for bonding a large range of substrates including metals, plastics and glass to similar or different substrates and indeed they give better performance than the previously discussed adhesives on many of these substrates, especially glass. The compositions of the invention are particularly useful for bonding low surface energy substrates e.g. those having a surface energy of less than 45 mJ/m$^2$, more particularly polyolefins including polyethylene and polypropylene, acrylonitrile-butadiene-styrene and polytetrafluroethylene, or relatively low surface energy substrates such as polycarbonate, to similar substrates, to each other, or to different substrates including metals, other plastics and glass.

In a particular aspect the invention relates to an adhesive composition as defined above for bonding a low surface energy substrate to a similar or different substrate. In such composition it is preferred that at least two of $R_1$ and $R_2$ are straight chain $C_1$–$C_4$ alkyl.

Furthermore the invention provides a method for bonding a substrate to a similar or different substrate, wherein the method comprises applying an adhesive composition as defined above to at least one of the substrates, bringing the substrates together and allowing the composition to cure. In one aspect, the invention provides a method as defined above for bonding a low surface energy substrate such as a polyolefin substrate to a similar or different substrate.

In particular the invention provides a method for bonding a substrate, particularly a low surface energy substrate, to a similar or different substrate, wherein the method comprises mixing parts A and B of a two part adhesive composition immediately prior to use in order to initiate polymerisation, applying the mixed adhesive composition to at least one of the substrates, bringing the substrates together and allowing the composition to cure by completion of the polymerisation initiated on mixing of the two parts A and B.

DETAILED DESCRIPTION OF THE INVENTION

According to one aspect of the invention M is an alkali metal ion such as lithium, sodium, potassium, or caesium, particularly lithium, sodium or potassium, although metallic elements in the second row of the Periodic Table such as barium, magnesium or calcium may be useable, as may transition metals such as copper, iron or cobalt.

$R^1$–$R^3$ may suitably be the same or different alkyl group and each may suitably be a $C_1$–$C_6$ alkyl group, particularly a $C_2$–$C_4$ alkyl group. Desirably the three alkyl groups $R^1$–$R^3$ are the same group. Large or bulky alkyl groups are considered to be less likely to provide desirably active initiators, as will be understood by those skilled in free-radical chemistry. A cycloalkyl group may suitably be $C_5$–$C_6$ group.

Examples of suitable alkali metal salts in which $R^1$–$R^3$ are the same alkyl group include the following: Lithium triethylborohydride, Sodium triethylborohydride, Potassium triethylborohydride, Lithium tri-sec-butylborohydride, Sodium tri-sec-butylborohydride, Potassium tri-sec-butylborohydride, Lithium trisiamylborohydride, Potassium trisiamylborohydride and Lithium triethylborodeuteride. A particularly suitable example is Lithium triethylborohydride.

An example of a compound in which $R^2$ is an alkyl group and $R^1$ and $R^3$ are H is Lithium thexylborohydride. An example of a compound in which $R^1$ and $R^3$ form part of a cyclic ring is lithium 9-borabicyclo[3.3.1]-nonane (9BBN) hydride.

Desirably at least one of $R^2$ and $R^3$ is a $C_1$–$C_{10}$ alkyl group. Suitably one or both of $R^2$ and $R^3$ may be phenyl. Desirably not more than one of $R^2$ and $R^3$ contains a phenyl group. It will be understood by those skilled in the art that a phenyl group may be substituted in the ring by one or more substituents which do not affect the activity of the compound of formula I or II as a polymerisation initiator. Such ring-substituents include $C_1$–$C_{10}$ alkyl, for example $C_1$–$C_6$ alkyl, particularly methyl.

The above-identified compounds are commercially available from various suppliers such as Sigma-Aldrich Ireland Limited of Dublin 24, Ireland e.g under trade names such as Super-hydride, Selectride, and Super-deuteride, or Callery Chemicals of Evans City Pa., USA under trade names such as CalSelect. Other suitable compounds include the metal borohydrides analogous to the boron compounds as described in the Ritter patents such as, for example diisopinocamphenylborane, dicyclohexylborane, and diisoamylborane.

One group of exemplary compounds includes the following: Lithium triethylborohydride, Sodium triethylborohydride, Potassium triethylborohydride, Lithium tri-sec-butylborohydride, and Lithium 9-borabicyclo [3.3.1]-nonane (9-BBN) hydride.

The metal alkyl borohydride may suitably be used in a solvent such as tetrahydrofuran, diglyme, dibutyl ether, toluene or a hydrocarbon solvent, for example at 1 molar concentration, preferably not more than about 1.5 molar, although the person skilled in the art will select a suitable concentration depending upon the solvent used.

The quantity of metal alkyl borohydride may suitably be such as to provide 0.01% to 5% by weight, particularly 0.01% to 2% by weight, such as 0.01 to 0.6% by weight, of boron in the total composition. For ease in handling, the metal alkyl borohydride is suitably used in a solution in a concentration up to about 1.5M, such as about 1M.

The free-radically polymerisable monomer may be selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes. Among suitable acrylates and methacrylates are those used in polymerisable systems such as disclosed in U.S. Pat. Nos. 4,295,909, 4,018,851, 4,963,220 to Baccei et. al., and U.S. Pat. No. 4,215,209 to Ray-Chaudhuri et. al. or polyfunctional methacrylates, silicone diacrylates and polyfunctional acrylated urethanes of the type known to be useful in formulating adhesives e.g. as disclosed in U.S. Pat. No. 4,092,376 to Douek et. al.) or a thiol-ene (e.g. as disclosed in U.S. Pat. Nos. 3,661,744, 3,898,349, 4,008,341 or 4,808,638). The contents of the above-mentioned patents are incorporated herein by reference.

Suitable monomers include monofunctional acrylate and methacrylate esters and substituted derivatives thereof such as hydroxy, amide, cyano, chloro, and silane derivatives. Such monomers include tetrahydrofurfuryl (meth)acrylate, methyl (meth)acrylate, ethyl (meth)acrylate, isobornyl methacrylate, hydroxyethyl methacrylate, hydroxypropyl (meth)acrylate, butyl acrylate, n-octyl acrylate, 2-ethylhexyl (meth)acrylate, decylmethacrylate, dodecyl methacrylate, cyclohexyl methacrylate, tert.-butyl methacrylate, acrylamide, gamma-methacryloxypropyl trimethoxysilane, 2-cyanoethyl acrylate, 3-cyanopropyl acrylate, tetrahydrofurfuryl chloroacrylate, and glycidyl (meth)acrylate.

Blends of two or more monomers, particularly two or more (meth)acrylate monomers, may desirably be used, the choice of monomers in the blend being determined by the end use application of the compositions, as known to those skilled in the art.

It has been found that the metal alkyl borohydrides are effective initiators with or without an acid added to the composition. However the inclusion of an acid (which term includes a latent acid) in the monomer component (Part B) is desirable. For certain substrates and/or certain polymerisation speeds, the presence of an acid may be required. In other cases, acidic residues, for example in the monomers, may be sufficient. Alternatively, or in addition, the metal alkyl borohydride, being a reducing agent, may react with another compound in the composition (particularly in Part B of a two-part composition), which compound is open to reduction, for example an ester such as a methacrylate ester, or a metal in a higher valency state. Reaction of the metal alkyl borohydride with such a compound liberates the alkylborane to initiate polymerisation of the polymerisable composition. In the case of a 2-part composition, the reaction takes place after mixing of the two parts, one containing the metal alkyl borohydride and the other containing the acid or other compound reactive therewith.

The acid when added may suitably be a weak acid. Lewis acids may be used (see U.S. Pat. No. 5,539,070 to Zharov et al., the contents of which are incorporated herein by reference). The pKa of the weak acid normally is no lower than about 0.5 with the desirable limit being about 0.9. The upper limit normally is about 13, or less, such as 11.5. However, carboxylic acids which have a pKa of up to about 8, such as 6 or 7, are particularly suitable.

The carboxylic acids may contain one or more carboxyl groups, suitably 1 to 4, and more preferably 1 to 2, carboxyl groups. Suitable aliphatic carboxylic acids ordinarily include $C_{1-18}$ chains, such as $C_{1-10}$ monocarboxylic acids.

Suitable acids may be monobasic or polybasic. Typical but not limiting examples of suitable acids are formic acid, acetic acid, propionic acid, maleic acid, malic acid, fumaric acid, acrylic acid and copolymers thereof, methacrylic acid and copolymers thereof, pyruvic acid, itaconic acid, nadic acid, benzoic acid, phthalic acids, cinnamic acid, trichloroacetic acid and saccharin. It is particularly suitable to use an acidic monomer which can itself be polymerised, so that it is bound into the cured polymer composition, for example a part-ester of a polyfunctional acid wherein the ester group contains a free-radically polymerisable component, particularly a (meth)acrylic halfester of a difunctional acid such as maleic, fumaric or succinnic acid e.g. 2-(meth) acryloyloxyethyl maleate, 2-(meth)acryloxyethyl fumarate or 2-(meth) acryloxyethyl succinate. The effective amount of the acid or the acid residue of an acidic monomer or residue resulting from preparation of a monomer (if present) is suitably within the range from about 0.1 to about 20%, particularly from about 0.1 to about 10%, such as from about 0.5 to about 5% based on the weight of the polymerisable composition. The amount of an acidic monomer (if present) is suitably within the range from about 0.1% to about 25%, such as about 0.5% to about 15%, based on the weight of the polymerisable composition.

The acid may be present as a latent acid, particularly a masked carboxylic acid compound hydrolyzable on contact with moisture, such as an acid anhydride, as described in EP-A-0 356 875 and U.S. Pat. No. 5,268,436, the contents of which are incorporated herein by reference. A latent acid may be used in Part B of a two-part composition, in which the acid is released on mixing the two parts, or in a one-part composition.

The metal alkyl borohydride is desirably used with a carrier which is non-reactive with the metal alkyl borohydride. Most suitably, the carrier should be liquid, should be capable of supporting and carrying the borohydride, should be moisture-free, non-reactive with a base and not susceptible to free-radical polymerisation although it may react with polymeric acids of the adhesive component to contribute to the polymer network. The carrier may suitably be a solvent for the metal alkyl borohydride.

It is important that the metal alkyl borohydride and carrier should not react together or start to cross-link, causing a change in viscosity, before polymerisation of the total polymerisable composition is initiated. Suitable carriers include aziridine-functional materials which are described as diluents in PCT Publication No. WO 99/64528, which in turn refers to PCT Publication No., WO 98/17694, the counterpart of U.S. Pat. No. 5,935,711, the contents of all of which are incorporated herein by reference. When used, the metal alkyl borohydride is carried by (e.g., dissolved in or diluted by) an aziridine-functional material or a blend of two or more different aziridine-functional materials in the initiator component. As indicated above, the aziridine-functional material should not be reactive toward the metal alkyl borohydride. Also advantageously, the aziridine-functional material may reduce the flammabilty of the initiator component.

An "aziridine-functional material" refers to an organic compound having at least one aziridine ring or group,

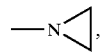

the carbon atom(s) of which may optionally be substituted by $C_1$–$C_{10}$ alkyl groups, particularly $C_1$–$C_3$ alkyl groups.

Suitable aziridine-functional materials are described in WO 98/17694 (U.S. Pat. No. 5,935,711). Polydifunctional aziridines such as trimethylolpropane tris(3-(2-methylaziridino) propionate are particularly suitable. The aziridine-functional material may also act as a cross-linking agent in the polymerisable composition, e.g. by reaction with an acid monomer or polymeric acid which may suitably be present in the composition as described above.

The aziridine-functional material should be generally soluble in monomers included in the polymerisable composition, such that the parts of the two-part composition can be readily mixed. By "soluble" is meant that no evidence of gross phase separation at room temperature (i.e., about 22° C. to about 25° C.) is visible to the unaided eye. Similarly, the metal alkyl borohydride should also desirably be soluble in the aziridine-functional material, although some heating may be required. Suitably, the aziridine-functional material is a liquid at or near room temperature (i.e., within about 10° C. of room temperature) or forms a liquid solution with the metal alkyl borohydride at near room temperature.

Other suitable carriers include liquid polyethers, liquid polyethers capped with non-reactive groups being groups which are not susceptible to free-radical polymerisation such as epoxies, liquid polyesters, polyisoprene or polybutadiene. A thickened solvent could also be used as a carrier. Polytetrahydrofuran could be used as both solvent and carrier. The quantity of carrier may suitably be in the range from about 5% to about 50% by weight, for example 5% to 25% by weight, particularly 5% to 10% by weight, of the total composition. It is an advantage of the present invention that a wider range of carriers can be used than with an amine-containing initiator system, e.g. an epoxy which could react with the amine.

The metal alkyl borohydride and carrier (optionally with thickener) are usually contained in Part A—the initiator component—of a two-part composition. If desired, Part A may also contain a complexing agent or sequestering agent, e.g. a calixarene or a polyether or polythioether, e.g. a crown ether or thiocrown ether respectively, with affinity for the metal in the alkali metal borohydride.

The monomer containing component—Part B of a two-part composition—may suitably include a toughener to improve the impact resistance and peel resistance of the bond while maintaining adhesive strength. Suitable tougheners include elastomeric materials such as polybutadiene rubbers, polyisoprene (.e.g. available under the trade name Kratan), acrylonitrile-butadiene-styrene (e.g. available under the trade name Hycaror or as core-shell polymers under the trade name Blendex), or polystyrenes. For bonding polyolefins it is desirable to use a core-shell polymer. The use of core-shell polymers in (meth)acrylate-based compositions is described, for example, in U.S. Pat. Nos. 4,536,546 and 4,942,201 Briggs et al. assigned to Illinois Tool Works. Core shell polymers are suitably graft copolymer resins (e.g. acrylonitrile-butadiene-styrene graft copolymers or others described in the above-mentioned patents of Briggs et al.) in the form of particles that comprise rubber or rubber—like cores or networks that are surrounded by relatively hard shells. In addition to improving the impact resistance of the bond, core-shell polymers can also impart enhanced spreading and flow properties to the composition (see WO 99/64528). These enhanced properties include a reduced tendency for the composition to leave an undesirable "string" upon dispensing from a syringe-type applicator, or sap or slump after having been applied to a vertical surface. The quantity of toughener may suitably be in the range from about 1% to about 40% by weight, particularly about 5% to about 25% by weight, of the total composition.

The composition may optionally further comprise oxidising agents, reducing agents, thickeners, fillers, non-reactive colourants and pigments, metal salts (particularly transition metal salts) and free radical polymerisation stabilisers. The optional additives are used in an amount that does not significantly adversely affect the polymerisation process or the desired properties of polymerisation products made thereby. Ingredients for a photopolymerisation system are not required and may be excluded.

Suitable reducing agents may be, but are not limited to, acetylphenylhydrazine, tetramethylthiourea or thiocaprolactam. Suitable oxidising agents may be, but are not limited to, peroxides and hydroperoxides.

Polymeric thickeners may be present in the compositions in a minor amount, up to about 50%, and may be thickeners such as a polymer or prepolymer of low or high molecular weight. Suitable polymeric thickeners are a commercially available methacrylate polymer sold by E.I. du Pont de Nemours and Company, under the trademark Elvacite, as well as styrene-methyl methacrylate co-polymers and polybisphenol A maleate or propoxylated bisphenol-A-fumarate polyester (sold under the trademark Atlac). It is also possible to add inert filling materials such as finely divided silica, fumed silica (treated or untreated), montmorillonite, clay, bentonite and the like. The use of micronized silica would result in a paste-like thixotropic composition. Polymeric thickeners or other thickeners such as silicas may suitably be present as a thickener for the carrier in Part A of a two-part composition.

It is an advantage of the present invention that a broader range of thickeners can be used than with an initiator system containing amine. Additionally, it is conventional to include in adhesive formulations certain "inert" fillers such as wood flour, glass fibres and hollow glass spheres, cotton linters, mica, alumina, silica and the like to modify viscosity, improve impact resistance and for other purposes. Such fillers could be incorporated in the formulations of the present invention. The quantity of filler is suitably from about 0.5% to about 20%, for example about 1.0% to about 5.0%, by weight of the composition. Small percentages of silane monomers could also be added to increase moisture resistance, as well as to enhance bonding of an adhesive to glass and similar surfaces. Other substances such as dyes, fire retarders, stabilizers such as quinones and hydroquinones, thixotropes, plasticizers, antioxidants, and the like may also be included, although such additives may often be furnished in the principal ingredients, making their separate introduction unnecessary.

It is a particular advantage of the invention that polyolefin materials can be used as fillers in the composition. Polyolefin powders such as polyethylene powder or polypropylene powder are relatively inexpensive and in a composition which readily bonds to a polyolefin the filler becomes securely adhered into the cured composition. Polyethylene or polypropylene powders can be used with particle sizes in the range from 0.01 mm to 1 mm, particularly 0.02 mm to 0.3 mm, allowing a good control of the gap between substrates (i.e. the depth of adhesive). Particularly suitable polyethylene powders are commercially available under the trade name Microthene. Polyethylene flock and polyolefin chopped fibre can also be used as fillers. The amount of polyolefin filler may suitably be 0.5% to about 20%, particularly 1.0% to about 10%, by weight of the composition.

Compositions of the present invention may be used as adhesives, sealants, surface coatings, moulding resins and composite matrices, for example with "fleece" or "padding" materials of glass fibre, carbon fibre, metal fibre, polyethylene or polypropylene fibre or foams, or any combination of them, particularly in which bonding of a low surface energy polymer is required.

The compositions may be used in an un-polymerised state, in which case polymerisation occurs in situ, or they may be used in a part-polymerised state, in which case polymerisation is completed in situ.

The components of a two-part composition may suitably be mixed immediately prior to use in a manner known to those skilled in the art.

The compositions of the invention are suited for use with conventional, commercially available dispensing equipment for two-part adhesives, for example a dual syringe applicator and a static mixer nozzle. In general the compositions are suitable for curing at room temperature, i.e. 20–25° without added heat or other energy input, although heat input may be desirable in some instances, for example to accelerate cure.

The compositions of the present invention may suitably comprise about 0.01% to about 5% by weight of the initiator, about 5% to about 50% by weight of the carrier (if present), about 0.1% to about 20% by weight of the acid (if present), about 5% to about 85% by weight of the polymerisable monomer(s) and about 1% to about 40% by weight of the toughener (if present). The compositions of the invention may suitably consist essentially of the ingredients defined in the preceding sentence, together with conventional ingredients such as fillers, thickeners or stabilizers, making up the total composition as 100%.

In a two-part composition, the parts may suitably be provided in a weight ratio in the range from 1:10 to 1:1 of initiator Component A to monomer-containing Component B, for example from 1:10 to 1:2, or from 1:10 to 1:4.

EXAMPLES

The following examples will illustrate the invention. In the examples the lithium triethyl borohydride solution used is commercially available from Sigma-Aldrich Ireland Limited of Dublin 24, Ireland under the tradename Superhydride. The other metal alkyl borohydrides and the trimethylolpropane tris(3-(2-methylaziridine) propionate used are also commercially available from Sigma-Aldrich Ireland Limited. The core-sheu tougheners used in the examples are commercially available from GE Speciality Chemicals via Blagden Chemical Specialities Limited, London WC1X8NJ, England under the tradenames Blendex 336 and Blendex 360. Additionally the propoxylated Bisphenol-A Fumarate polyester used in the examples is commercially available from DSM via Philips Duphar (Ireland) Ltd., Dublin, Ireland under the tradename Atlac 382. The fumed silica used is commercially available under the trade name Aerosil R972 from Degussa via Philips Duphar (Ireland) Limited, Dublin, Ireland.

In the examples the mixed adhesive composition is prepared using a MIXPAC System 50 1:10 volume ratio dual syringe applicator and a 17 stage static mixer nozzle, both commercially available from METIX (UK) Limited of Kettering NN16 8PX, England.

All of the tests on polypropylene substrates were carried out on filled polypropylene (i.e. polypropylene PP-HWST supplied by Simona U.K. (Limited) of Stafford, England unless otherwise indicated. The term "natural polypropylene" is used for polypropylene which has no fillers.

In carrying out the Examples, no tendency to catch fire was observed during the handling of the metal alkyl borohydride initiators.

Example 1

Initiator Component (Part A)

A lithium triethyl borohydride solution (2 g) (1 molar in tetrahydrofuran) was mixed with trimethylolpropane tris(3-(2-methylaziridino))propionate (3 g).

Adhesive Component (Part B)

A slurry comprising a core-shell toughener (50 g), available commercially under the tradename Blendex 336 from GE Speciality Chemicals, tetrahydrofurfuryl methacrylate (125 g), 2-ethylhexyl methacrylate (42 g) and 2-acryloyloxyethyl maleate (34 g) was stirred with a high shear mixer for several hours until a homogeneous dispersion was obtained.

Adhesive

The initiator component A (5g) and adhesive component B (45g) were packaged respectively into the two syringes of a MIXPAC System 50 1:10 volume ratio 50 ml dual syringe applicator having a 1:10 volume ratio between the syringes holding the components A and B respectively. The two components were mixed by the simultaneous extrusion through a 17 stage static mixer nozzle. The mixed adhesive composition was tested on a range of substrates as follows:

Samples of the adhesive were spread onto an untreated test-piece (4×1 inches) (101.6×25.4 mm) to form a film of approximately 0.1 mm in depth. Following which a second test-piece was brought against the adhesive to form an overlap adhesive joint with 0.5 inch (12.7 mm) overlap. A clamp was applied to the overlap area and the adhesive joint allowed to cure overnight, approximately 24 hours, at room temperature. The bond strengths for bonds assembled using the above procedure were tested on a Instron tester according to ASTM-D1002 and are presented in the table below.

| Substrates | Shear Strengths MPa |
|---|---|
| Polypropylene/Polypropylene | 4.2 +/− 0.5* |

*All the bonded assemblies slipped from the Instron jaws before the bonds broke

Example 2

Initiator Component (Part A)

A lithium triethyl borohydride solution (2 g) (1 molar in tetrahydrofuran) was mixed with trimethylolpropane tris(3-(2-methylaziridino))propionate thickened with 30% by weight of Propoxylated Bisphenol-A Fumarate polyester(3 g).

Adhesives were prepared and evaluated using the aforementioned initiator component and the adhesive component B from Example 1, to give the following results.

| Substrates | Shear Strengths MPa | 3 Kg Fixture times Minutes |
|---|---|---|
| Mild Steel/Polyethylene | 3.75* | 13 |
| Mild Steel/Polypropylene | 4.65* | 12 |
| Polycarbonate/Polycarbonate | 5.0 | n/a |
| Polypropylene/Polypropylene | 4.1** | 11 |
| Polyethylene/Polyethylene | 3.3 | 12 |

*Many of the bonded assemblies slipped from the Instron jaws before the bonds broke
**Most of the bonded assemblies slipped from the Instron jaws before the bonds broke The 3 Kg fixture times are the minimum cure times after bond assembly at which a bonded assembly will support a 3 Kg weight for a minimum of 10 seconds.

Example 3

Initiator Component (Part A)

The initiator component was prepared as outlined in Example 2.

Adhesive Component (Part B)

A slurry comprising a core-shell toughener Blendex 360 (100 g), tetrahydrofurfuryl methacrylate (249.5 g), 2-ethylhexyl methacrylate (83.2 g) and 2acryloyloxyethyl maleate (67.3 g) was stirred with a high shear mixer for several hours until a homogeneous dispersion was obtained.

Adhesive

A mixed adhesive composition was prepared as outlined in Example 1. The mixed adhesive composition was tested on a range of substrates as outlined in earlier examples. The bonds strengths for two sets of tests are presented in the table below.

| Substrates | Shear Strengths MPa | 3 Kg Fixture times Minutes |
|---|---|---|
| (i) 0.5 inch (12.7 mm) overlap | | |
| Polyethylene/Polyethylene | 3.7* | 12 |
| Polypropylene/Polypropylene | 4.2* | 12.5 |
| Mild Steel/Polyethylene | 3.2 | 10 |
| Mild Steel/Polypropylene | 3.2 | 10.5 |
| Polycarbonate/Polycarbonate | 4.6 | 10.5 |
| Mild Steel/Mild Steel | 6.9 | 12 |

*Many of the bonded assemblies slipped from the Instron jaws before the bonds broke

| Substrates | Shear Strengths MPa |
|---|---|
| (ii) 0.25 inch (6.3 mm) overlap | |
| Polyethylene/Polyethylene | 4.5 |
| Polypropylene(filled)/Polypropylene(filled) | 2.6 |
| Polyethylene/Polycarbonate | 3.0 |
| Glass/Polypropylene(filled) | 5.3 |
| Polycarbonate/Polypropylene(filled) | 5.5 |
| ABS/Polypropylene(filled) | 6.0 |
| Zinc Bichromate/Polypropylene(filled) | 5.0 |
| Glass/Polyethylene | 5.2 |
| ABS/ABS | 8.0 |
| Mild Steel/ABS | 8.0 |
| Zinc Bichromate/ABS | 9.0 |
| Nylon/Zinc Bichromate | 4.4 |

ABS is acrylonitrile-butadiene-styrene.

Example 4
Initiator Component (Part A)

A lithium triethyl borohydride solution (2 g) (1 molar in tetrahydrofuran) was mixed with trimethylolpropane tris(3-(2-methylaziridino))propionate (3 g) thickened with 30% by weight of Propoxylated Bisphenol-A Fumarate polyester.

Adhesive Component (Part B)

A slurry having the ingredients of Adhesive Component B of Example 3 together with a micronised polyethylene powder (25 g) commercially available under the tradename Microthene FN500 distributed by National Chemical Company, Ireland, was stirred with a high shear mixer for several hours until a homogeneous dispersion was obtained.

Adhesive

A mixed adhesive composition was prepared as outlined in Example 1. The mixed adhesive composition was tested on a range of substrates as outlined in earlier examples The bonds strengths are presented in the table below.

| Substrates | Shear Strengths MPa | 3 Kg Fixture times Minutes |
|---|---|---|
| Polyethylene/Polyethylene | 4.2 | 13 |
| Polypropylene/Polypropylene | 4.6* | 12.0 |
| Mild Steel/Polyethylene | 4.5 | 11 |
| Mild Steel/Polypropylene | 4.9* | 11.5 |
| Polycarbonate/Polycarbonate | 3.8 | 9.5 |
| Mild Steel/Mild Steel | 9.2 | 13 |

*Many of the polypropylene substrates were stretched before the bonds broke

These results show significant improvements over Example 3, in which the polyethylene powder filler was not used.

Example 5
Initiator Component (Part A)

The initiator component was prepared as outlined in Example 4.

Adhesive Component (Part B)

The adhesive component was prepared as outlined in Example 3.

Adhesive

A mixed adhesive composition was prepared as outlined in Example 1. The mixed adhesive composition was tested on a range of substrates as follows:

samples of the adhesive were spread onto an untreated test-pieces (4×1 inches—101.6×25.4 mm) to form a film of approximately 0.1 mm in depth. Following which a second test-piece was brought against the adhesive to form an overlap adhesive joint with 0.25 inch (6.4 mm) overlap. A clamp was applied to the overlap area and the adhesive joint allowed to cure overnight, approximately 24 hours, at room temperature. The bonds strengths for bonds assembled using the above procedure were tested on a Instron tester according to ASTM-D1002 and are presented in the table below.

| Substrates | Shear Strengths MPa |
|---|---|
| Polyethylene/Polyethylene | 8.0 |
| Polypropylene/Polypropylene | 7.9 |
| Mild Steel/Polyethylene | 8.8 |
| Mild Steel/Polypropylene | 6.9 |

| Substrates | Shear Strengths MPa |
|---|---|
| Mild Steel/EPDM | 2.7 |
| Mild Steel/Glass (pins/Collar) | 12.1* |

*tested as (pins/Collar)
EPDM is a polyolefin rubber (ethylene-propylene dimonomer) obtained from James Walker Ireland Limited as EPDM 4 in sheet form of 4.4 mm thickness.

Example 6
Initiator Component (Part A)

A lithium triethyl borohydride solution (2 g) (1 molar in tetrahydrofuran) was mixed with the polyfunctional epoxy (3 g) commercially available from Ciba, Basle, Switzerland as DY-0396.

Adhesive Component (Part B)

The adhesive component was prepared as outlined in Example 3.

Adhesive

A mixed adhesive composition was prepared as outlined in Example 1. The mixed adhesive composition was tested on a range of substrates as outlined in example 1 giving the following results

| Substrates | Shear Strengths MPa |
|---|---|
| Polyethylene/Polyethylene | 1.5 |
| Polypropylene/Polypropylene | 3.0 |
| Mild Steel/Polyethylene | 2.6 |
| Mild Steel/Polyproplene | 4.1 |

Example 7
Initiator Component (Part A)

A lithium triethyl borohydride solution (10 g) (1 molar in tetrahydrofuran) was mixed with trimethylolpropane tris(3-(2-methylaziridino))propionate thickened with 30% by weight of Propoxylated Bisphenol-A Fumarate polyester (15 g). The tetrahydrofuran was removed by evaporation.

Adhesive Component (Part B)

The adhesive component was prepared as outlined in Example 3.

Adhesive

The mixed adhesive composition was prepared as outlined in Example 1. The mixed adhesive composition was tested on a range of substrates as outlined in example 5, i.e. using the 0.25 inch (6.4 mm) overlap area The bonds strengths are presented in the table below.

| Substrates | Shear Strengths MPa |
|---|---|
| Polyethylene/Polyethylene | 4.5 |
| Polypropylene/Polypropylene | 4.7 |
| Mild Steel/Polyethylene | 6.7 |
| Mild Steel/Polypropylene | 7.8 |
| Polycarbonate/Polycarbonate | 5.3 |

The results demonstrate that the presence of solvent in the initiator component is not necessary for polyolefin adhesion performance. Thus it is possible to prepare solvent-less polyolefin bonding adhesives, which have potentially significant environmental and labelling advantages.

Example 8
Initiator Component (Part A)

A lithium tri-sec-butylborohydride solution (2 g) (1 molar in tetrahydrofuran) commercially available under the tradename L-Selectride® from Sigma-Aldrich Ireland Ltd. was mixed with trimethylolpropane tris(3-(2-methylaziridino)) propionate thickened with 30% by weight of Propoxylated Bisphenol-A Fumarate polyester (3 g).

Adhesive Component (Part B)

The adhesive component was prepared as outlined in Example 3.

Adhesive

The mixed adhesive composition was prepared as outlined in Example 1. The mixed adhesive composition was tested on a range of substrates as outlined in example 1 The bonds strengths for two sets of tests are presented in the table below.

| Substrates | Shear Strengths MPa |
|---|---|
| (i) 0.5 inch (12.7 mm) overlap | |
| Polyethylene/Polyethylene | 2.1 |
| Polypropylene/Polypropylene | 3.1 |
| Mild Steel/Polyethylene | 2.7 |
| Mild Steel/Polypropylene | 2.3 |
| Polycarbonate/Polycarbonate | 3.35 |
| Mild Steel/Mild Steel | 8.0 |
| (ii) 0.25 inch (6.3 mm) overlap | |
| Polypropylene(natural)/Polypropylene(natural) | 3.9 |
| Glass/ABS | 5.7* |
| Polycarbonate/Polypropylene(natural) | 2.9 |
| ABS/Polypropylene(natural) | 5.6 |
| Polycarbonate/ABS | 4.3 |
| Zinc Bichromate/Polypropylene(natural) | 6.2 |
| Polyethylene/Polyethylene | 2.6 |
| Zinc Bichromate/Polyethylene | 3.5 |
| Mild Steel/Polypropylene(natural) | 8.9 |
| Mild Steel/Polyethylene | 5.0 |
| Glass/Polyethylene | 2.9* |
| ABS/Polyethylene | 2.6 |
| Glass/Polypropylene(natural) | 3.7* |
| ABS/ABS | 5.8 |
| Mild Steel/ABS | 9.3 |
| Zinc Bichromate/ABS | 10.4 |

In tests (ii), all bonds were tested after 96 hours unless otherwise indicated.
*Bonds tested after 24 hours

Example 9
Initiator Component (Part A)

A lithium tri-sec-butylborohydride solution (2 g) (1 molar in tetrahydrofuran) commercially available under the tradename N-Selectride® from Sigma-Aldrich Ireland Ltd. was mixed with trimethylolpropane tris(3-(2-methylaziridino)) propionate thickened with 30% by weight of Propoxylated Bisphenol-A Fumarate polyester (3 g).

Adhesive Component (Part B)

The adhesive component was prepared as outlined in Example 3.

Adhesive

The mixed adhesive composition was prepared as outlined in Example 1. The mixed adhesive composition was tested on a range of substrates as outlined in example 1. The bonds strengths for two sets of tests are presented in the table below.

| Substrates | Shear Strengths MPa |
|---|---|
| (i) 0.5 inch (12.7 mm) overlap | |
| (Polyethylene/Polyethylene | 2.8 |
| Polypropylene/Polypropylene | 4.0 |
| Mild Steel/Polyethylene | 3.9 |
| Mild Steel/Polypropylene | 2.6 |
| Polycarbonate/Polycarbonate | 3.1 |
| Mild Steel/Mild Steel | 6.5 |
| (ii) 0.25 inch (6.3 mm) overlap | |
| Polypropylene(natural)/Polypropylene(natural) | 4.6* |
| Glass/ABS | 4.8** |
| Polycarbonate/Polypropylene(natural) | 2.3* |
| ABS/Polypropylene(natural) | 3.2** |
| Polycarbonate/ABS | 6.7** |
| Zinc Bichromate/Polypropylene(natural) | 6.0* |
| Polyethylene/Polyethylene | 3.1** |
| Zinc Bichromate/Polyethylene | 2.0** |
| Mild Steel/Polypropylene(natural) | 3.7* |
| Mild Steel/Polyethylene | 3.8* |
| Glass/Polyethylene | 4.7** |
| ABS/Polyethylene | 4.2** |
| Glass/Polypropylene(natural) | 3.8** |
| ABS/ABS | 8.0** |
| Mild Steel/ABS | 8.2** |
| Zinc Bichromate/ABS | 9.4** |

*Bonds tested after 24 hours
**Bonds tested after 48 hours

Example 10
Initiator Component (Part A)

A Sodium triethyl borohydride solution (2 g) (1 molar in tetrahydrofuran) commercially available from Sigma-Aldrich Ireland Ltd. was mixed with trimethylolpropane tris(3-(2-methylaziridino))propionate thickened with 30% by weight of Propoxylated Bisphenol-A Fumarate polyester (3 g).

Adhesive Component (Part B)

The adhesive component was prepared as outlined in Example 3.

Adhesive

The mixed adhesive composition was prepared as outlined in Example 1. The mixed adhesive composition was tested on a range of substrates as outlined in earlier examples. The bonds strengths for two sets of tests are presented in the table below.

| Substrates | Shear Strengths MPa |
|---|---|
| (i) 0.5 inch (12.7 mm) overlap | |
| (Polyethylene/Polyethylene | 1.4 |
| Polypropylene/Polypropylene | 0.7 |
| Mild Steel/Polyethylene | 1.15 |
| Mild Steel/Polypropylene | 2.0 |
| (ii) 0.25 inch (6.3 mm) overlap | |
| Polyethylene/Polyethylene | 1.9 |
| Polypropylene(filled)/Polypropylene(filled) | 2.9 |
| Polypropylene(natural)/Polypropylene(natural) | 4.3 |
| Midl Steel/Polypropylene(natural) | 3.6 |
| Mild Steel/Polypropylene(filled) | 3.5 |

-continued

| Substrates | Shear Strengths MPa |
|---|---|
| Glass/Polypropylene(filled) | 2.5 |
| Polycarbonate/Polypropylene(filled) | 2.8 |
| ABS/Polypropylene(filled) | 2.8 |
| Zinc Bichromate/Polypropylene(filed) | 6.5 |
| Glass/Polyethylene | 3.3 |
| ABS/ABS | 7.3 |
| Mild Steel/ABS | 6.0 |
| Zinc Bichromate/ABS | 7.8 |

Example 11
Initiator Component (Part A)

A Potassium triethyl borohydride solution (2 g) (1 molar in tetrahydrofuran) commercially available from Sigma-Aldrich Ireland Ltd. was mixed with trimethylolpropane tris(3-(2-methylaziridino))propionate thickened with 30% by weight of Propoxylated Bisphenol-A Fumarate polyester (3 g).

Adhesive Component (Part B)

The adhesive component was prepared as outlined in Example 3.

Adhesive

The mixed adhesive composition was prepared as outlined in Example 1. The mixed adhesive composition was tested on a range of substrates as outlined in earlier examples The bonds strengths for two sets of tests are presented in the table below.

| Substrates | Shear Strengths MPa |
|---|---|
| (i) 0.5 inch (12.7 mm) overlap | |
| Polyethylene/Polyethylene | 2.5 |
| Polypropylene/Polypropylene | 1.9 |
| Mild Steel/Polyethylene | 3.0 |
| Mild Steel/Polypropylene | 2.9 |
| Mild Steel/Mild Steel | 9.5 |
| (ii) 0.25 inch (6.3 mm) overlap | |
| Polypropylene(natural)/Polypropylene(natural) | 3.2 |
| Glass/ABS | 4.9 |
| Polycarbonate/Polypropylene(natural) | 2.2 |
| ABS/Polypropylene(natural) | 2.4 |
| Zinc Bichromate/Polypropylene(natural) | 3.4 |
| Zinc Bichromate/Polyethylene(natural) | 5.2 |
| Mild Steel/Polypropylene(natural) | 3.4 |
| Mild Steel/Polyethylene | 3.8 |
| Glass/Polypropylene(natural) | 1.7 |
| ABS/ABS | 5.2 |
| Mild Steel/ABS | 5.4 |
| Zinc Bichromate/ABS | 4.3 |

Example 12
Initiator Component (Part A)

A Lithium 9-BBN (borobicyclo nonane) hydride solution (2 g) (1 molar in tetrahydrofuran) commercially available from Sigma-Aldrich Ireland Ltd. was mixed with trimethylolpropane tris(3-(2-methylaziridino))propionate thickened with 30% by weight of Propoxylated Bisphenol-A Fumarate polyester (3 g).

Adhesive Component (Part B)

The adhesive component was prepared as outlined in Example 3.

Adhesive

The mixed adhesive composition was prepared as outlined in Example 1. The mixed adhesive composition was tested on a range of substrates as outlined in Example 5. The bond strengths are presented in the table below.

| Substrates | Shear Strengths Mpa |
|---|---|
| Polypropylene/Polypropylene | 0 |
| Polyethylene/Polyethylene | 0 |
| Mild Steel/Polypropylene | 0 |
| Mild steel/Polyethylene | 0 |
| Mild Steel/Mild Steel | 9.4 |
| Polycarbonate/Polycarbonate | 3.1 |

These results show that when the alkyl groups of the initiator form a cyclic structure, the adhesive polymerises well and bonds steel but has poor adhesion to polyolefins.

Example 13
Initiator Component (Part A)

A lithium triethyl borohydride solution (0.5 g) (1 molar in tetrahydrofuran) was mixed with trimethylolpropane tris(3-(2-methylaziridino))propionate thickened with 30% by weight of Propoxylated Bisphenol-A Fumarate polyester (3 g).

Adhesive Component (Part B)

The adhesive component was prepared as outlined in Example 3.

Adhesive

The mixed adhesive composition was prepared as outlined in Example 1. The mixed adhesive composition was tested on a range of substrates as outlined in Example 1. The bonds strengths are presented in the table below.

| Substrates | Shear Strengths MPa |
|---|---|
| Polyethylene/Polyethylene | 3.8 |
| Polypropylene/Polypropylene | 3.0 |

Example 14
Initiator Component (Part A)

A lithium triethyl borohydride solution (1.0 g) (1 molar in tetrahydrofuran) was mixed with trimethylolpropane tris(3-(2-methylaziridino))propionate thickened with 30% by weight of Propoxylated Bisphenol-A Fumarate polyester (3 g).

Adhesive Component (Part B)

The adhesive component was prepared as outlined in Example 3.

Adhesive

The mixed adhesive composition was prepared as outlined in Example 1. The mixed adhesive composition was tested on a range of substrates as outlined in Example 1. The bond strengths are presented in the table below.

| Substrates | Shear Strengths MPa |
|---|---|
| Polyethylene/Polyethylene | 4.9 |
| Polypropylene/Polypropylene | 4.8 |
| Mild Steel/Polyethylene | 4.7 |
| Mild Steel/Polypropylene | 4.8 |

Example 15
Initiator Component (part A)
A lithium triethyl borohydride solution (3.0 g) (1 molar in tetrahydrofuran) was mixed with trimethylolpropane tris(3-(2-methylaziridino))propionate thickened with 30% by weight of Propoxylated Bisphenol-A Fumarate polyester (3 g).
Adhesive Component (Part B)
The adhesive component was prepared as described in Example 3.
Adhesive
The initiator component A (5 g) and adhesive component B (45 g) were mixed as described in Example 1. The mixed adhesive composition was tested on a range of substrates as outlined in example 1. The bonds strengths are presented in the table below.

| Substrates | Shear Strengths MPa |
|---|---|
| Polyethylene/Polyethylene | 1.9 |
| Polypropylene/Polypropylene | 4.2 |
| Polyethylene/Polypropylene(unfilled) | 5.2 |
| Mild Steel/Polyethylene | 4.7 |
| Mild Steel/Polypropylene | 4.9 |
| Mild Steel/Polypropylene(unfilled) | 4.3 |
| PTFE | 1.0 |

PTFE is polytetafluoroethylene

Example 16
Example 8 was followed except that the initiator compound used was lithium trisiamylborohydride which is commercially available under the tradename LS Selectride® from Sigma-Aldrich Ireland Ltd. The bond strengths from tests with 0.25 inch (6.3 mm) overlap were as follows:

| Substrates | Shear Strengths MPa |
|---|---|
| Polypropylene/Polypropylene | 0.5 |
| Polyethylene/Polyethylene | 0.4 |
| Mild Steel/Polypropylene | 0.5 |
| Mild Steel/Polyethylene | 0.8 |
| Mild Steel/Mild Steel | 8.0 |

These results illustrate the effectiveness of the initiator in a composition which polymerises well and bonds steel but shows that when the alkyl groups on the boron atom are longer or more branched than straight-chain $C_1$–$C_4$ alkyl there is a significant reduction of polyolefin bonding capability.

Example 17
Samples of potassium tri-sec-butyl borohydride in tetrahydrofuran (commercially available) and in diglyme and dibutyl ether were obtained from Callery Chemicals, and were compared with potassium tri-sec-butyl borohydride commercially available under the tradename K-Selectride from Sigma-Aldrich Ireland Ltd. Example 11 was followed except that these initiator compounds were used. The bond strengths for tests with 0.25 inch (6.23 mm) overlaps were as follows:

| Tri alkyl borohydride salt | Bond Strengths MPa PE/GBMS | PE/PE | PP/PP |
|---|---|---|---|
| Calselect K (K tri sec-butyl BH in THF) | 5.7 | 2.2 | 1.8 |
| Calselect K (K tri sec-butyl BH in Diglyme) | 5.3 | 2.7 | 2.1 |
| Calselect K (L tri sec-butyl BH in $Bu_2O$) | 5.8 | 5.2 | 2.9 |
| K-Selectride (K tri sec-butyl BH in THF) (Aldrich) | 4.5 | 2.7 | 3.1 |

PE/GBMS = polyethylene/mild steel
PE/PE = polyethylene/polyethylene
PP/PD = polypropylene/polypropylene Example 18
Initiator Component (Part A)
Lithium triethylborohydride 1 molar in THF (Super-Hydride from Aldrich) (2 g) was added to trimethylolpropane tris(3-(2-methylaziridino))propionate thickened with 5% by weight of fumed silica Aerosil R972 manufactured by Degussa (3 g).
Adhesive Component (Part B)
A slurry comprising a core-shell toughener (100 g), available commercially under the tradename Blendex B336 from GE Specialty Chemicals, tetrahydrofurfuryl methacrylate 249.5 g), 2-ethylhexyl methacrylate (83.2 g) and 2-acroyloyloxyethyl maleate (67.3 g) was stirred with a high shear mixer for several hours until a homogeneous dispersion was obtained.
Adhesive
The adhesive component A (5 g) and component B (45 g) were packaged respectively into a MIXPAC System 50 1:10 volume ratio dual syringe applicator commercially available from METIX (UK) Limited. Several samples of the packaged adhesives were placed in temperature controlled environments at 35° C. and at monthly intervals one of the packages was removed and tested. The two components were mixed by the simultaneous extrusion through a 17 stage static mixer nozzle also available from METIX (UK) Ltd. The mixed adhesive composition was tested on a range of substrates as outlined in Example 5. The bond strengths are presented in the table below.

| | Shear Strengths MPa after ageing at 35° C. | | | | |
|---|---|---|---|---|---|
| Substrates | 1 month | 2 months | 3 months | 4 months | 5 months |
| Polyethylene/Polyethylene | 6.6 | 2.4 | 3.2 | 3.2 | 5.2 |
| Polypropylene/Polypropylene | 3.5 | 5.0 | 5.0 | 3.1 | 5.2 |

Example 19
Initiator Component (Part A)
Lithium triethylborohydride 1 molar in THF (Super-Hydride from Aldrich) (2 g) was added to trimethylolpropane tris(3-(2-methylaziridino))propionate thickened with 5% by weight of fumed silica Aerosil R972 manufactured by Degussa (3g).

Adhesive Component (Part B)
Adhesive compositions were prepared with varying levels of acid ingredients as outlined below:

|  | 0% Acid | 5% Acid | 10% Acid | 20% Acid |
|---|---|---|---|---|
| Blendex B360 | 100 g | 100 g | 100 g | 100 g |
| tetrahydrofurfuryl methacrylate | 249 g | 249 g | 249 g | 249 g |
| 2-ethylhexyl methacrylate | 150.5 g | 124.5 g | 100.5 g | 50.5 g |
| 2-acryloyloxyethyl maleate | 0 g | 25 g | 50 g | 100 g |

Adhesive

Mixed adhesive compositions were prepared as in Example 1. The mixed adhesive compositions were tested on a range of substrates as outlined in Example 5. The bond strengths are presented in the table below.

|  | Bond Strengths/MPa for Acid levels | | | |
|---|---|---|---|---|
| Substrates | 0% | 5% | 10% | 20% |
| Polyethylene/Polyethylene | 1.7 | 3.4 | 4.4 | 2.1 |
| Mild Steel/Polypropylene | 2.0 | 4.5 | 4.2 | 3.0 |
| Mild Steel/Mild Steel | 2.5 | 1.5 | 7.5 | 8.0 |

A range of carboxylic acids were screened and found to be active, for example replacing 2 acryloyloxyethyl maleate with either acrylic acid or methacrylic acid had little effect on the adhesive performance. Generally the simple polymerisable carboxylic acids are preferred.

What is claimed is:

1. A polymerisable composition comprising:
   a) at least one free-radically polymerisable monomer component, and
   b) an effective amount of an initiator system for initiating polymerisation of the free-radically polymerisable monomer, said initiator system comprising a metal alkyl borohydride of the formula I or II:

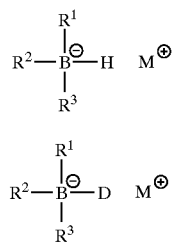

wherein
   $R^1$ is $C_1$–$C_{10}$ alkyl,
   $R^2$ and $R^3$, which may be the same or different, and are selected from the group consisting of H, D, $C_1$–$C_{10}$ alkyl, $C_3$–$C_{10}$ cycloalkyl, phenyl, phenyl-substituted $C_1$–$C_{10}$ alkyl, and phenyl-substituted $C^3$–$C_{10}$ cycloalkyl, provided that any of $R^1$–$R^3$ may optionally be part of a carbocyclic ring, and
   $M^+$ is a metal ion.

2. A composition according to claim 1 which is a two-part composition in which the free-radically polymerisable monomer component is provided in one part and the metal alkyl borohydride is provided in the other part.

3. A two-part polymerisable adhesive composition according to claim 1 comprising:
   part A) an effective amount of a polymerisation initiator comprising the metal alkyl borohydride, and a carrier inert to the metal alkyl borohydride; and
   part B) at least one (meth)acrylate monomer, optionally with a toughener, acidic monomer, filler or thickener.

4. A composition according to claim 1 wherein the metal alkyl borohydride is of the formula I.

5. A composition according to claim 1 wherein the metal alkyl borohydride is of formula I or II in which $M^+$ is an alkali metal ion.

6. A composition according to claim 1, wherein each of $R^1$–$R^3$ is $C_2$–$C_6$ alkyl group.

7. A composition according to claim 1 wherein each of $R^1$–$R^3$ is the same $C_2$–$C_4$ alkyl group.

8. A composition according to claim 1, wherein the metal salt is selected from the group consisting of: lithium triethylborohydride, sodium triethylborohydride, potassium triethylborohydride, lithium tri-sec-butylborohydride, sodium tri-sec-butylborohydride, potassium tri-sec-butylborohydride, lithium 9-borabicyclo [3.3.1]-nonane (9-BBN) hydride, lithium thexylborohydride, lithium trisiamylborohydride, potassium trisiamylborohydride, and lithium triethylborodeuteride.

9. A composition according to claim 1 wherein the metal salt is selected from the group consisting of: lithium triethylborohydride, sodium triethylborohydride, potassium triethylborohydride, lithium tri-sec-butylborohydride, sodium tri-sec-butylborohydride, potassium tri-sec-butylborohydride and lithium triethylborodeuteride.

10. A composition according to claim 1 for bonding a low surface energy substrate to a similar or different substrate.

11. A composition according to claim 1 for bonding a polyolefin substrate to a similar or different substrate.

12. A composition according to claim 1, further comprising a polyolefin filler.

13. A composition according to claim 1 further comprising an aziridine-functional material as a carrier for the metal alkyl borohydride.

14. A composition according to claim 1 further comprising a core-shell polymer toughener.

15. A composition according to claim 1, wherein the free-radically polymerisable monomer component comprises a (meth)acrylic monomer.

16. A composition according to claim 15, wherein the free-radically polymerisable monomer component comprises at least two (meth)acrylic monomers.

17. A composition according to claim 1, wherein the quantity of metal alkyl borohydride is such as to provide 0.01% to 5% by weight of boron in the total composition.

18. A composition according to claim 1 which includes an acid in the polymerisable monomer component.

19. A composition according to claim 18 wherein the acid has a pKa from 0.5 to about 13.

20. A composition according to claim 18 wherein the acid is an acidic monomer.

21. A composition according to claim 1 wherein at least a portion of the metal alkyl borohydride is a 1:2 adduct of the formula Ia or IIa:

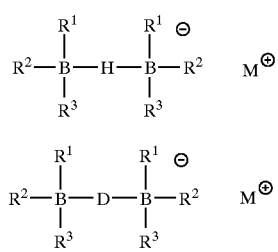

wherein R¹, R², R³, and M⁺ are as defined above.

22. A method for bonding a substrate, particularly a low surface energy substrate such as a polyolefin substrate, to a similar or different substrate, wherein the method comprises applying a composition according to claim 1 to at least one of the substrates, bringing the substrates together with the composition between them and allowing the composition to cure.

23. A method according to claim 22, wherein the method comprises mixing parts A and B of a two part adhesive composition immediately prior to use in order to initiate polymerisation, applying the mixed adhesive composition to at least one of the substrates, bringing the substrates together and allowing the composition to cure by completion of the polymerisation initiated on mixing of the two parts A and B.

24. A method of initiating polymerisation in a free-radically polymerisable monomer which comprises mixing the monomer with a metal alkyl borohydride of the formula I or II as defined in claim 1, optionally in the presence of an added acid.

25. A method according to claim 24 wherein the acid is an acidic monomer which is free-radically polymerisable.

26. A cured adhesive composition comprising the polymerisation product of a composition according to claim 1.

27. A bonded article comprising two substrates bonded by the polymerisation product of a composition according to claim 1.

28. A bond formed between two substrates by the polymerisation product of a composition according to claim 1.

29. A polymerisable composition, which includes
a) at least one free-radically polymerisable monomer component,
b) an effective amount of an initiator system for initiating polymerisation of the free-radically polymerisable monomer, said initiator system comprising a metal alkyl borohydride of the formula I or II as defined in claim 1, and
c) an effective amount of a compound that is reactive with the metal alkyl borohydride to free an organoborane from the metal alkyl borohydride and thus to initiate polymerisation of the at least one free-radically polymerisable monomer.

30. A system capable of initiating the polymerisation of a (meth)acrylic monomer, the system comprising:
a) a metal alkyl borohydride of the formula I or II as defined in claim 1; and
b) an effective amount of a compound that is reactive with the metal alkyl borohydride to free an organoborane from the metal alkyl borohydride.

31. A polymerisable acrylic composition comprising:
a) a (meth)acrylic component comprising at least one (meth)acrylic monomer;
b) an effective amount of a metal alkyl borohydride of the formula I or II as defined in claim 1; and
c) an effective amount of a compound that is reactive with the metal alkyl borohydride to free an organoborane from the metal alkyl borohydride and thus to initiate polymerisation of the at least one (meth)acrylic monomer.

32. A composite article comprising a first substrate and a second substrate bonded to the first substrate by an acrylic adhesive, wherein the acrylic adhesive comprises the polymerisation product of a polymerisable acrylic composition that comprised:
a) a (meth)acrylic component comprising at least one (meth)acrylic monomer;
b) an effective amount of a metal alkyl borohydride of the formula I or II as defined in claim 1, and
c) an effective amount of a compound that is reactive with the metal alkyl borohydride to free an organoborane from the metal alkyl borohydride and thus to initiate polymerisation of the at least one (meth)acrylic monomer.

33. A method of bonding a low surface energy polymer to a substrate, the method comprising the steps of:
i) providing a low surface energy polymer;
ii) providing a substrate;
iii) providing an adhesive composition comprising:
a) at least one (meth)acrylic monomer;
b) an effective amount of a metal alkyl borohydride of the formula I or II as defined in claim 1; and
c) an effective amount of a compound that is reactive with the metal alkyl borohydride to free an organoborane from the metal alkyl borohydride and thus to initiate polymerisation of the at least one (meth) acrylic monomer;
iv) applying the adhesive composition to either the low surface energy polymer or the substrate;
v) joining the low surface energy polymer and the substrate with the adhesive composition therebetween; and
vi) permitting the adhesive composition to cure to adhesively bond the low surface energy polymer and the substrate.

34. A method according to claim 22 which is carried out in the presence of air or oxygen.

35. A method according to claim 24 which is carried out in the presence of air or oxygen.

36. A method according to claim 33 which is carried out in the presence of air or oxygen.

* * * * *